(12) United States Patent
Holfelder et al.

(10) Patent No.: US 11,866,929 B2
(45) Date of Patent: Jan. 9, 2024

(54) PANEL COATING SYSTEM (71) Applicant: KNAUF GIPS KG, Iphofen (DE)

(72) Inventors: Klaus Holfelder, Iphofen (DE); Ruth Schnobrich, Würzburg (DE); Klaus Wandler, Rödelsee (DE); Klaudius Hengst, Iphofen (DE)

(73) Assignee: KNAUF GIPS KG, Iphofen (DE)

( * ) Notice: Subject to any disclaimer, the term of this patent is extended or adjusted under 35 U.S.C. 154(b) by 248 days.

(21) Appl. No.: 17/414,271

(22) PCT Filed: Dec. 19, 2019

(86) PCT No.: PCT/EP2019/000346
§ 371 (c)(1),
(2) Date: Jun. 15, 2021

(87) PCT Pub. No.: WO2020/126068
PCT Pub. Date: Jun. 25, 2020

(65) Prior Publication Data
US 2022/0056687 A1 Feb. 24, 2022

(51) Int. Cl.
| *E04B 1/86* | (2006.01) |
| *B32B 5/06* | (2006.01) |
| *E04B 1/99* | (2006.01) |
| *E04B 9/00* | (2006.01) |
| *G10K 11/162* | (2006.01) |
| *E04B 1/84* | (2006.01) |
| *B32B 3/26* | (2006.01) |

(Continued)

(52) U.S. Cl.
CPC ............... *E04B 1/86* (2013.01); *B32B 3/266* (2013.01); *B32B 5/073* (2021.05); *B32B 7/14* (2013.01); *B32B 13/12* (2013.01); *B32B 27/12* (2013.01); *E04B 1/99* (2013.01); *E04B 9/001* (2013.01); *G10K 11/162* (2013.01); *G10K 11/168* (2013.01); *B32B 2255/02* (2013.01); *B32B 2255/12* (2013.01); *B32B 2262/08* (2013.01); *B32B 2307/102* (2013.01); *B32B 2307/724* (2013.01); *B32B 2607/00* (2013.01); *E04B 2001/848* (2013.01); *E04B 2001/8461* (2013.01)

(58) Field of Classification Search
CPC ... E04B 1/86; E04B 1/99; E04B 9/001; E04B 2001/8476; E04B 2001/848; G10K 11/162; B32B 5/073
See application file for complete search history.

(56) References Cited

U.S. PATENT DOCUMENTS 4,744,189 A * 5/1988 Wilson .............. B44C 7/022
434/421
5,144,786 A 9/1992 Pacione
(Continued)

FOREIGN PATENT DOCUMENTS

| EP | 2048296 A2 | 4/2009 |
| JP | S48-009519 A | 2/1973 |

(Continued)

OTHER PUBLICATIONS

International Search Report and Written Opinion received for PCT/EP2019/000346, dated Jan. 29, 2021.

*Primary Examiner* — Jeremy A Luks
(74) *Attorney, Agent, or Firm* — Greer, Burns & Crain, Ltd (57) ABSTRACT

A panel coating system for simple and efficient installation of a removably attachable layer to a panel.

26 Claims, 8 Drawing Sheets

(51) Int. Cl.
  *B32B 7/14*     (2006.01)
  *B32B 13/12*    (2006.01)
  *B32B 27/12*    (2006.01)
  *G10K 11/168*   (2006.01)

(56) References Cited

U.S. PATENT DOCUMENTS

| | | | |
|---|---|---|---|
| 10,024,056 B2 * | 7/2018 | Pacione | E04F 15/02016 |
| 10,132,086 B2 * | 11/2018 | Wood | E04F 13/08 |
| 10,378,215 B2 * | 8/2019 | Drochon | A44B 18/0015 |
| 2008/0001431 A1 * | 1/2008 | Thompson | B60R 13/08 |
| | | | 181/290 |
| 2008/0230309 A1 * | 9/2008 | Fox | B32B 5/02 |
| | | | 428/339 |
| 2014/0000978 A1 | 1/2014 | Dugan et al. | |
| 2015/0144421 A1 * | 5/2015 | Becker | B32B 9/04 |
| | | | 181/290 |
| 2017/0081843 A1 * | 3/2017 | Berneth | G10K 11/16 |

FOREIGN PATENT DOCUMENTS

| | | |
|---|---|---|
| JP | S56-012609 U | 2/1981 |
| JP | H0960251 A | 3/1997 |
| JP | 3120833 U | 3/2006 |
| JP | 2007058109 A | 3/2007 |
| JP | 2013011156 A | 1/2013 |
| JP | 2015175105 A | 10/2015 |
| WO | 2020126069 A1 | 6/2020 |

\* cited by examiner

Figure 2

PANEL COATING SYSTEM

BACKGROUND

The present disclosure relates to a panel coating system for simple and efficient installation of a removably attachable layer to a panel.

Room acoustics are an important factor that must be taken into consideration during building construction or renovation. Many public institutions such as classrooms and lecture halls, have strict regulations regarding room acoustics which must be adhered to, whilst areas such as offices and apartments require the noise management for comfort or even health, especially when open plan, minimalist furniture styles are employed. Additionally, room acoustics are a variable that need to be carefully controlled in environments such as theatres and music rooms, for optimal conditions for their intended use.

A key factor used to indicate room acoustics is reverberation time. Reverberation time refers to the amount of time required for a sound to fade away inside an enclosed space. Sounds inside a room may reverberate when sound waves fail to be absorbed by surfaces they come into contact with, instead reflecting off said surfaces inside the enclosed space.

This reverberation time can be reduced by modifying surfaces such that sound in a relevant frequency range is absorbed more, and the reflections are hence minimised. An open-pored, acoustically/sound absorbent material such as mineral fibre/wool, polyester fibre, PUR foam, may be utilized for this effect.

For the improvement of room acoustics in the required environments, sound absorbing materials such as these may be utilized on wall, ceiling, and even floor surfaces. In general, sound absorbing materials and/or structures may be sold with a finished surface such as mineral fibre ceilings. Further, improvement of room acoustics can also be achieved by modifying the structure of a panel, for example a perforated plasterboard with mineral wool backing, which is attached to a suspension system of metal profiles or wooden slats.

Sound absorbing materials and/or structures installed upon the surfaces of a room, are often required, or preferred, to blend seamlessly with the environment, such that it is not obvious to a user that any sound dampening features have been installed. It is thus desirable that the sound absorbing materials and/or structures are installed in a way that they appear to form a single, uniform surface, with no discernible gaps between features.

It is known to install sound absorbing materials in the form of e.g. sound absorbing panels. However, these have their own drawbacks in regards to acoustic effectiveness, and concealability.

Perforated sound absorbing panels, such as the Knauf Cleaneo Acoustic linear panels, can be suspended from the a ceiling via connections to the back of said panels, whilst mineral fibre panels are often held in place via a grid-like railing structure which surround the edges of the individual panels.

However, there remains the often undesirable effect that a system utilizing either of the above mentioned structures, does not form an optically closed surface, i.e. one which is continuous and unperforated in appearance. The perforated sound absorbing panels have a large number of visible holes, whilst the mineral fibre panels comprise railing structures, which visibly separate the plurality of panels.

Alternative methods of joint/edge/hole concealment have featured the application of acoustic plaster on a carrier board, such as perforated plasterboard. Unfortunately, to gain the sound dampening advantages of acoustic plaster requires careful, complex and expensive installation. The effectiveness of acoustic plaster is thus highly dependent upon its installation, which means expertise is required, and the end result cannot be guaranteed for a consumer affordably and reliably.

Furthermore use of acoustic plaster carries the disadvantage of renovation or repairs being either prevented, or performed only with extreme difficulty.

In addition, the sound dampening properties of acoustic plaster is reliant upon the air permeability of the plaster itself, and covering the plaster with additional layers of non-air permeable material, such as paint or varnish, impedes air flow, and reduces (or completely negates) the sound dampening properties of the plaster. As such, modification of the surface appearance becomes difficult or impossible.

There are further disadvantages for using acoustic plaster such as discolouration in areas where air flows through the plaster, in contrast to areas of no-flow. This leaves a somewhat spotty colouring across the surface, which cannot be successfully countered. Furthermore, design issues occur when attempting to install fixings to the acoustic plaster surface. As the acoustic plaster creates a uniform surface across a plurality of underlying boards, once covered, it is difficult to know whether the drilling of components into this surface is penetrating the plasterboard itself, or underlying substructures.

Another possibility for joint/edge/hole concealment is acoustic wallpaper such as that developed by Knauf. An advantage over acoustic plaster is that the acoustic effect during application is virtually non-destructible for the user. Disadvantages however, are the high costs (similar to acoustic plaster), and the very special and dirt-sensitive processing. Much like the acoustic plaster, the problem of subsequent installations and/or fastenings on a perforated ceiling tile wherein its holes are no longer visible, and the lack of opportunity for renovation, still remains (a new wallpaper must be applied, which is again expensive in the acquisition and application, whilst painting is also not possible).

Whilst sound dampening has been described, it is noted that many of these problems are present even when considering standard wall coatings. Application or repairs of wallpaper and plaster are difficult to perform smoothly, and often require costly expertise for the consumer. Furthermore, customisation of a surface requires time and expertise, resulting in people rarely redecorating a room, as modifications are seen as substantially permanent. As such, it is a problem that people are limited by the alterations and repairs that can be made using the standard wall coatings presently used.

It is thus an object of the present invention to provide a system comprising a plurality of individual elements, in particular sound dampening panels, which comprise an additional layer that allows for the covering of facets of the underlying structure, especially perforations in sound absorbing panels and/or railing structures, such that an optically closed surface can be achieved.

It is also an object of the present invention that the covering of the panels with a layer be done in a removable manner such that they allow for easy installation and customisation of surfaces in a room, such as a wall or ceiling, depending on user preference or requirement, and the layer may also be easily removed for repairs or replacement.

It is another object of the invention that the covering of the panels be done in a manner that does not prevent airflow, such that air may still pass to, and through, the panels, thereby utilizing the sound dampening structure.

SUMMARY

The present invention relates to a panel coating system comprising a panel, a receiving surface, and a removably attachable layer. One of the receiving surface and the removably attachable layer comprises a plurality of hooks, whilst the other comprises gripable surface elements onto which the hooks can grip.

Through the complimentary hook and gripable surface elements connection, the removably attachable layer of the present invention is attached such that the it can be easily removed, allowing for greater flexibility of the system. This means said layer may be removed or replaced for repairs, and can also be swapped or customized in light of user preferences.

Preferably, the receiving surface, and/or the removably attachable layer are air permeable.

The air permeability of the receiving surface and/or the removably attachable layer ensures that any sound dampening structure, which the panel comprises, and relies upon air flow, is not impeded and thus the sound dampening properties of the panel are still achieved.

The receiving surface of the present invention may be attached to the panel, or may be a surface of the panel itself, or may be the surface of a layer attached to the panel.

The panel of the present invention may be connectable to an external surface (e.g. a ceiling) by one or more attachment elements, wherein these attachment elements may suspend the panel from said external surface. These attachment elements may comprise railings which run along one or more edges of the panel or features which connect to a back surface of the panel, i.e. the surface of the panel, which is on the opposite side of the receiving surface.

The removably attachable layer may have a surface area that extends beyond the panel to which it is to be attached, such that it can cover both the panel and any adjacent attachment elements, e.g. railings.

In a preferred aspect of the present invention, the gripable surface elements comprise either loops or fibres, preferably felt, which can be gripped by the hooks.

In a preferred aspect of the present invention, the panel has a sound absorbing structure. The panel may comprise a plurality of holes. The receiving surface may also comprise a plurality of holes, wherein these holes align with the holes of the panel.

In a preferred aspect of the invention, an additional outer layer, e.g. a micro-perforated wallpaper may be fixed to the removably attachable layer on the opposite side of the removably attachable layer to the layer which is to be removably attached to the receiving surface.

The panel coating system of the present invention may also comprise multiple panels, each with their own receiving surface. Each panel may also have a respective removably attachable layer, or a removably attachable layer may be large enough such that it covers a plurality of panels. However, in general the size of the panels and the size of the removably attachable layer may not depend on each other, since it is also possible to cover the surface of the panel with more than one removably attachable layer, if they are of smaller size than the panel.

Said removably attachable layer may have side surfaces, which, when a plurality of removably attachable layers are placed next to one another, no gaps between said layers are visible. These side surfaces may be flat and extend perpendicular to the surface that is to be attached to the receiving surface. Further, the removably attachable layer may also be of a stable shape. In addition, a preferred thickness of the removably attachable layer may be in the range of 2 mm and 10 mm, preferably in the range of 4 mm and 7 mm.

In a preferred aspect of the invention the removably attachable layers may be made of a synthetic and/or natural fibre, preferably felt, wherein the removably attachable layers may be joined by felting.

The present invention also relates to a method for producing a panel coating system, wherein said method includes the steps of: fixing a receiving surface to a panel, and producing or providing a removably attachable layer. One of the receiving surface and the removably attachable layer comprise a plurality of hooks, whilst the other comprises gripable surface elements onto which said hooks can grip. The removably attachable layer and/or the receiving surface may be air permeable.

In a preferred aspect of the present invention, the method also comprises the steps of perforating the receiving surface, and making a plurality of holes in the panel.

In a further preferred aspect of the present invention, the receiving surface is attached to the panel, and then holes are produced in both, during a single process.

In an alternate preferred aspect of the present invention, perforation of the receiving surface, and the producing of holes in the panel are produced in separate processes, and the receiving surface and panel are fixed together afterwards.

In another alternate preferred aspect of the present invention, holes are produced in the panel, after which, the receiving surface is fixed to said panel, and then perforations are made in the receiving surface.

In a further alternate preferred aspect of the present invention, the plurality of holes are made in the panel, and separately, the receiving surface is produced in a net like structure, with a plurality of openings.

DETAILED DESCRIPTION

Figure 1:
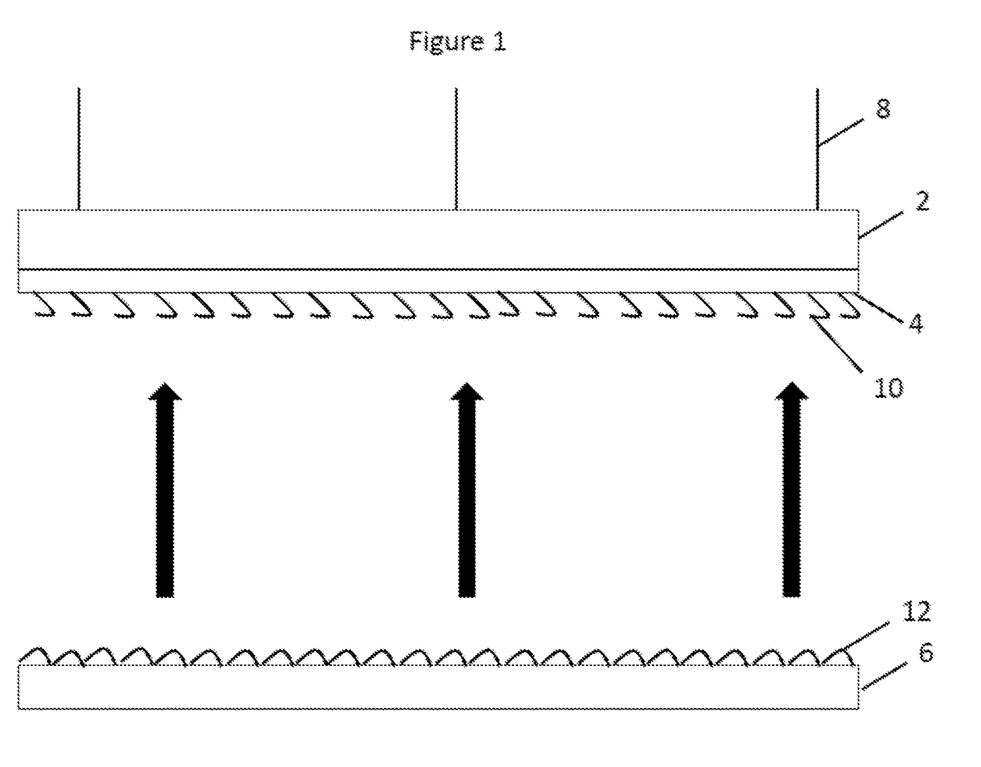
FIG. 1 outlines a panel coating system according to a first embodiment of the present invention.

A panel 2 coating system according to a first embodiment of the present invention can be seen in FIG. 1. Said panel coating system comprises a panel 2, and a receiving surface 4.

The panel 2 as seen in FIG. 1 may be of a mineral fibre material, which is air permeable.

The receiving surface 4 as seen in FIG. 1 comprises a plurality of hooks 10, which extend out of the receiving surface 4 on a surface opposite to the surface of the receiving surface 4 which is fixed to the panel 2.

The receiving surface 4 may be fixed to the panel 2 via a fixing means such as an adhesive, or may be attached via lamination. This attachment may be sufficiently strong that a force necessary to remove the receiving surface 4 from the panel 2 is greater, preferably far greater, than a force necessary to separate the receiving surface 4 from the removably attachable layer 6.

This ensures that a force applied by a user during detachment of the removably attachable layer 6 from the receiving surface 4 will not remove the receiving surface 4 from the panel 2 it is attached to.

The system also comprises a removably attachable layer 6. Said removably attachable layer 6 comprises features onto which the hooks 10 of the receiving surface 4 may grip, spread across a surface of the removably attachable layer 6 intended to be attached to the receiving surface 4.

The removably attachable layer 6 may comprise loops added to a surface of the removably attachable layer 6 such that it can be attached to the receiving surface 4. Alternatively, the removably attachable layer 6 may be made of a material that the hooks 10 of the receiving surface 4 can grip. This may be a fibrous material such as felt.

Both the receiving surface 4, and the removably attachable layer 6 are air permeable such that air may flow through them. This allows the sound dampening structure of the panel 2 to be utilized.

The panel 2 is connected to a number of attachment elements 8, which connect the panel 2 to an external surface. The external surface to which the system of FIG. 1 is to be connected is preferably a ceiling. The attachment elements 8 of FIG. 1 provide only an indication of a connection to an external surface. The attachment elements 8 may comprise a grid-like structure, which surround the edge of a panel 2, and vertical members that suspend the grid like structure from the ceiling.

The attachment elements 8 may alternatively comprise a feature attached to the upper surface (i.e. the surface opposite the surface connected to the receiving layer) of the panel which is then connected to the ceiling via further vertical components for example cables, rods, or various other rigid structural elements.

As is indicated by the arrows of FIG. 1, the attachment of the removably attachable layer 6 is simply performed by joining the gripable surface elements 12 and the removably attachable layer 6.

The pressing force applied to the removably attachable layer 6 should be sufficient to allow the complimentary attachment features to interact and form a sufficient connection with one another. Said pressing force may be applied by hand. Alternatively, the pressing force may be applied by a hand-operated tool, or a machine operated tool.

The removably attachable layer 6 may be removable by hand, such that a user can simply pull the removably attachable layer 6 from the receiving surface 4. Alternatively, there may be a removal tool for aiding in the removal of the removably attachable layer 6.

The complimentary attachment features (hooks 10 and gripable surface elements 12) should thus provide an attachment of sufficient strength that the removably attachable layer 6 may be held to a ceiling against the force of gravity over long periods of time.

Figure 2:
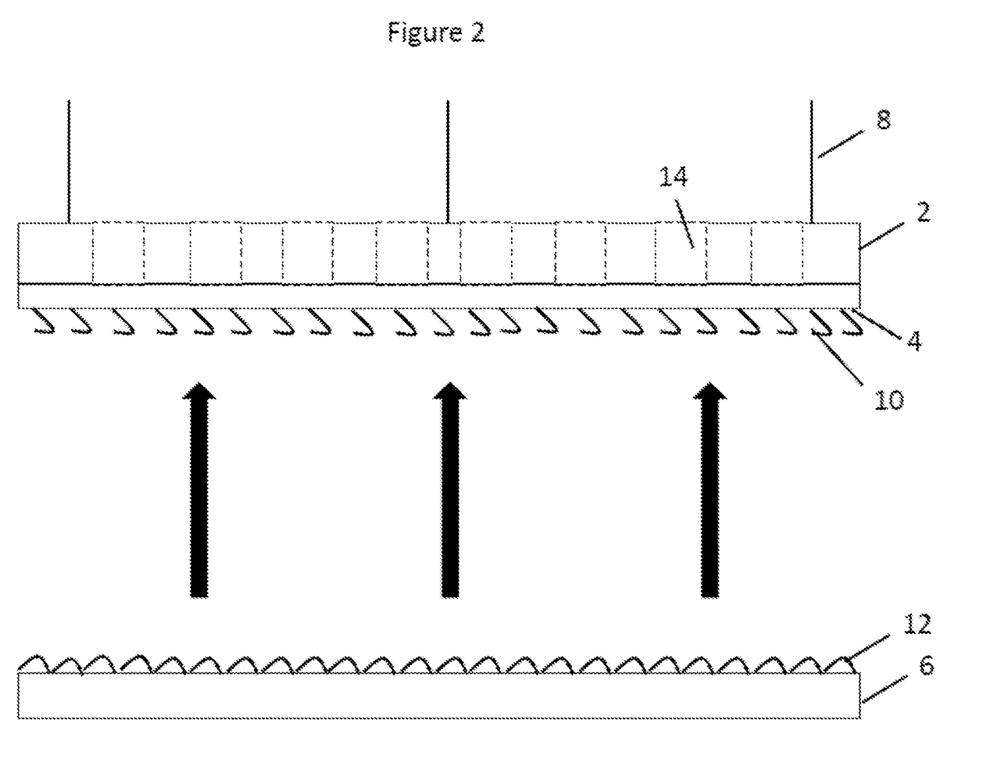
FIG. 2 outlines a panel coating system according to a second embodiment of the present invention, wherein the panel comprises a plurality of holes.

A second embodiment of the present invention may be seen in FIG. 2. Unless otherwise stated the second embodiment comprises the same components as the first embodiment.

The second embodiment of the present invention differs from the first embodiment of the present invention in that the panel 2 comprises a plurality of through holes 14. Said holes 14 allow air to flow through the board. These holes 14 may provide sound dampening properties that can be utilised in acoustic management of a room. Said holes 14 can provide sound dampening affects to the environment in which they are installed. These holes 14 may have any one of a variety of shaped cross section, such as rectangular, square or circular. As the holes 14 in the panel 2 play a large part in providing the sound dampening effects of the panel 2, hole distribution and size can thus be selected to provide the required sound dampening effects for a chosen environment. The panel 2 may preferably be a Knauf Cleaneo acoustic board.

Figure 3:
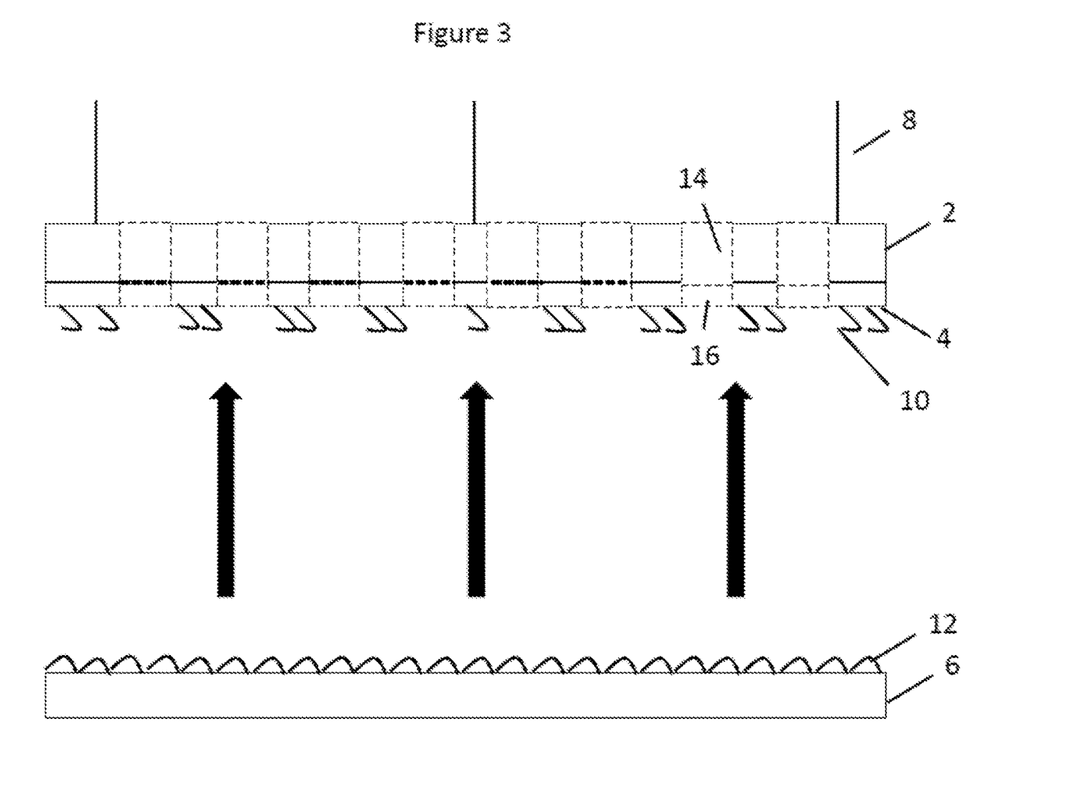
FIG. 3 outlines a panel coating system according to a third embodiment of the present invention, wherein both the panel and receiving surface comprise a plurality of holes.

A third embodiment of the present invention may be seen in FIG. 3. Unless otherwise stated the third embodiment comprises the same components as the second embodiment. The third embodiment may comprise through holes 16 in the receiving surface 4 also. These through holes 16 may align with the through holes 14 of the panel 2 such that extended passages through both the receiving surface 4 and panel 2 are formed.

Figure 4:
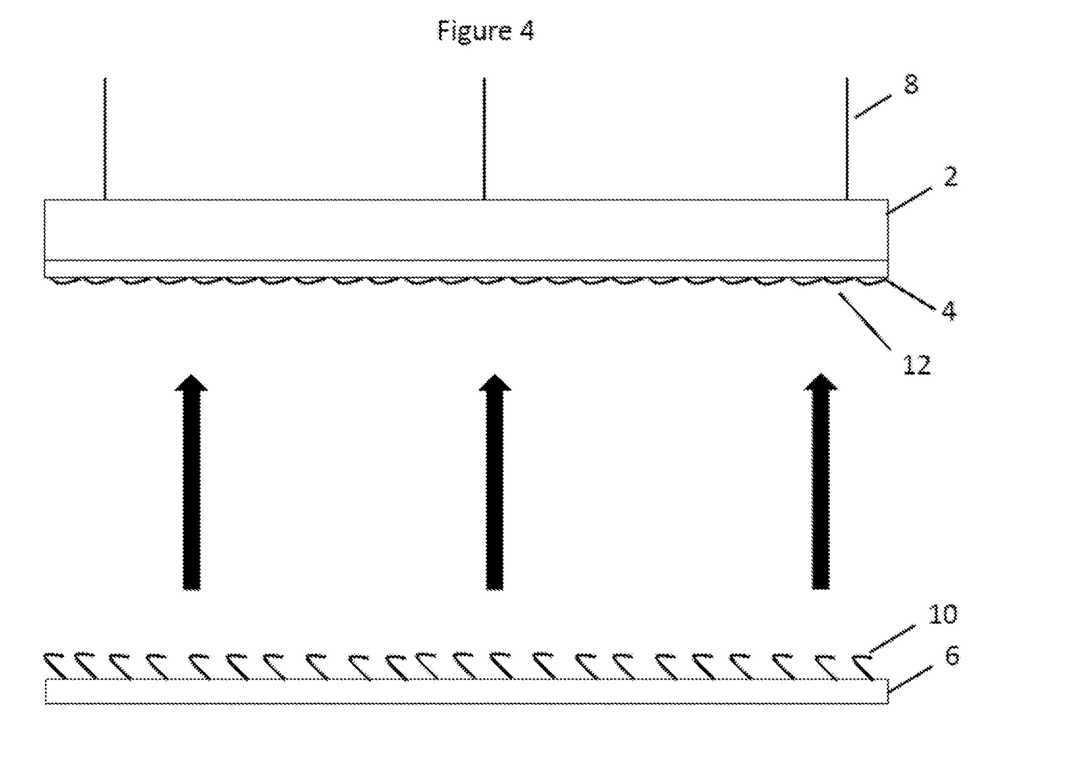
FIG. 4 outlines a panel coating system according to a fourth embodiment of the present invention.

A fourth embodiment of the present invention may be seen in FIG. 4. Unless otherwise stated the fourth embodiment comprises the same components as the first embodiment.

The fourth embodiment differs from the first embodiment in that the removably attachable layer 6 comprises a plurality of hooks 10 (much like the receiving surface 4 of the first embodiment), whilst the receiving surface 4 comprises features onto which the hooks 10 of the removably attachable layer 6 may grip (much like the removably attachable layer 6 of the first embodiment).

It should be noted that the receiving surface 4 may not be a separate layer fixed to the panel 2, but the outer surface of the panel 2 may act as the receiving surface 4 when the panel 2 itself is made of a material which hooks 10 can grip.

The fourth embodiment may also feature an additional outer layer (not illustrated) which is fixed to the removably attachable layer 6, e.g. a wallpaper or even a thin fabric. Said layer should be air permeable such that it does not prevent air flow, thereby ensuring that the sound dampening properties of the panel 2 may be achieved.

Figure 5:
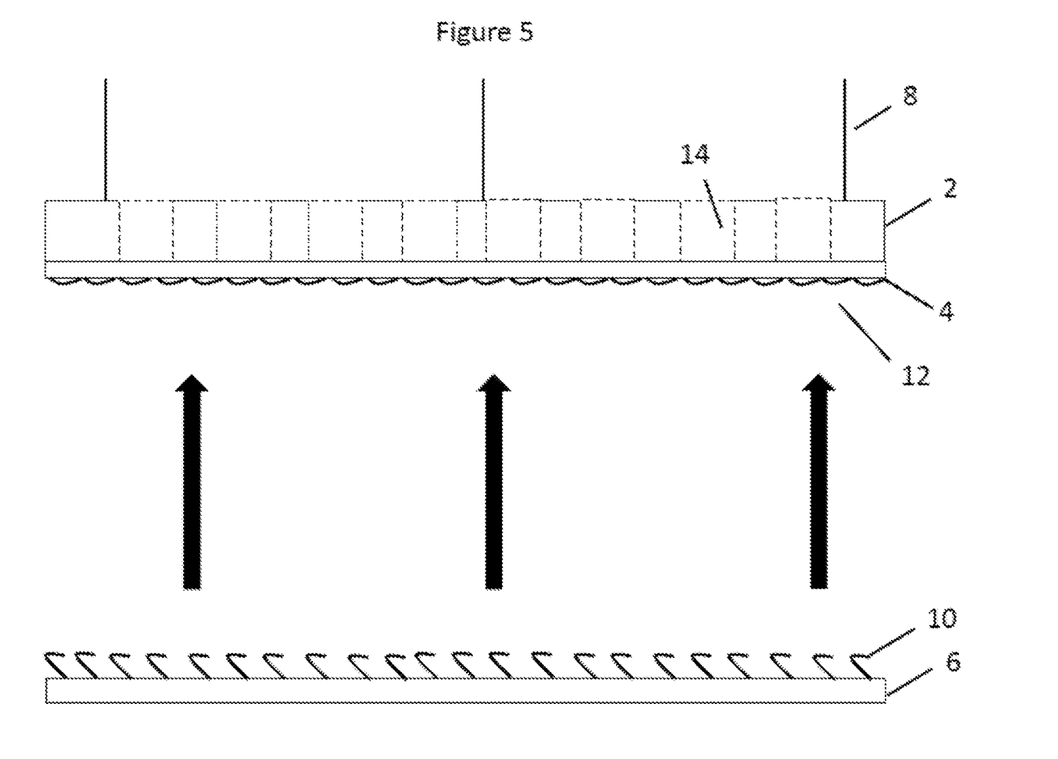
FIG. 5 outlines a panel coating system according to a fifth embodiment of the present invention, wherein the panel comprises a plurality of holes.

A fifth embodiment of the present invention may be seen in FIG. 5. Unless otherwise stated the fifth embodiment comprises the same components as the fourth embodiment.

The fifth embodiment of the present invention differs from the fourth embodiment of the present invention in that the panel 2 comprises a plurality of through holes 14. Said holes 14 allow air to flow through the board. This structure offers sound dampening advantages. The panel 2 may preferably be a Knauf Cleaneo acoustic board.

Figure 6:
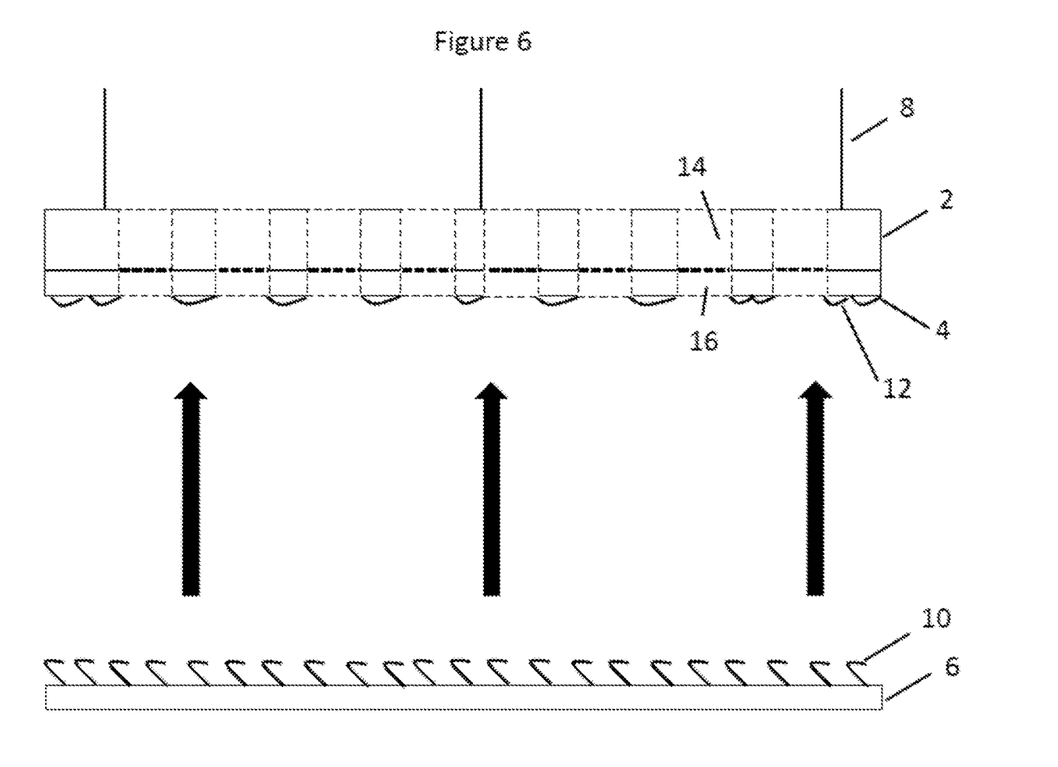
FIG. 6 outlines a panel coating system according to a sixth embodiment of the present invention, wherein both the panel and receiving surface comprise a plurality of holes.

A sixth embodiment of the present invention may be seen in FIG. 6. Unless otherwise stated the sixth embodiment comprises the same components as the fifth embodiment.

The sixth embodiment may comprise through holes 16 in the receiving surface 4 also. These through holes 16 may align with the through holes 14 of the panel 2 such that extended passages through both the receiving surface 4 and panel 2 are formed.

Figure 7:
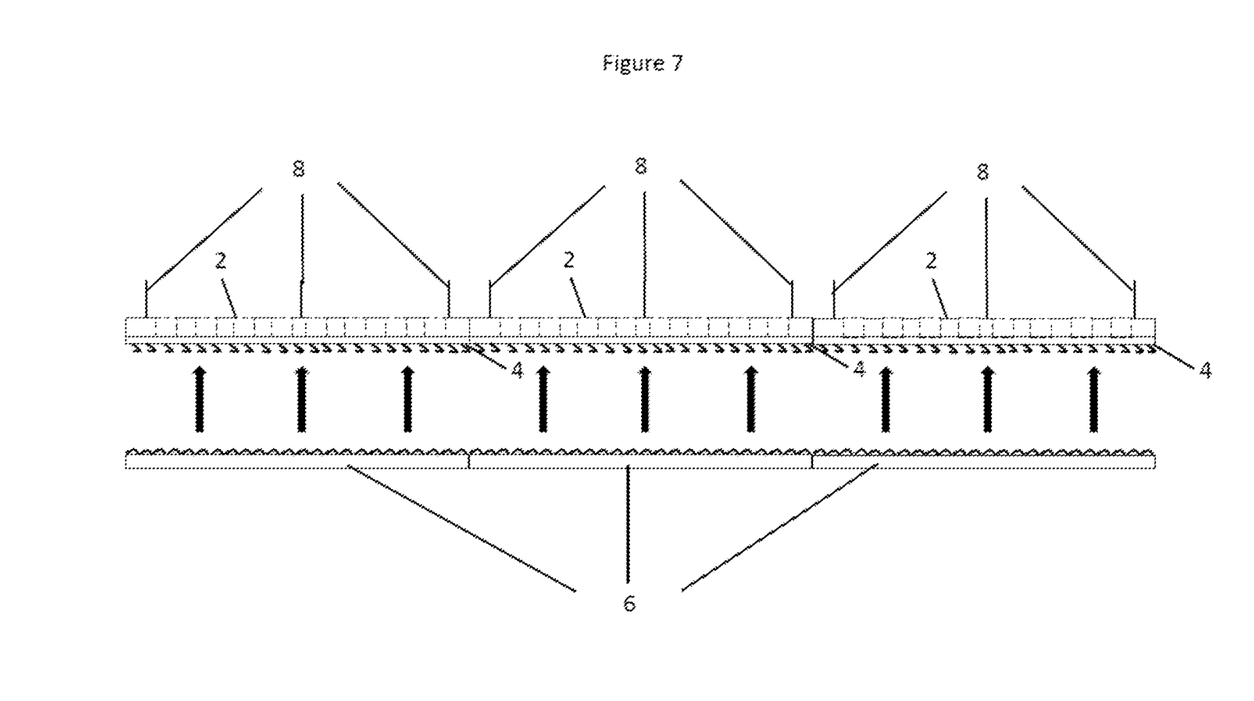
FIG. 7 outlines a panel coating system according to the present invention, including a plurality of panels with receiving surfaces, and respective removably attachable layers.

FIG. 7 shows a panel coating system according to the present invention, comprising a plurality of panels 2, with receiving surfaces 4, and respective removably attachable layers 6.

The panels 2 may be arranged alongside one another such that there are no gaps between the panels 2. Likewise, the removably attachable layers 6 may also be attached such that they can be positioned side by side and no gaps can be seen, thereby forming an optically closed surface.

The adjacent removably attachable layers 6 may be fixed to one another via a fixing means ensuring a tight bond is formed between a removably attachable layer 6 and an adjacent removably attachable layer 6. For example, they may be secured to each other via an adhesive. They may also be secured by an acoustic sealant, which both seals, and has sound absorption capabilities of its own.

Alternatively, when the removably attachable layers 6 are made from a fibrous material such as felt, they may be felted together using a special tool, e.g. a felting needle.

Whilst FIG. 7 has been shown using multiple panels 2, receiving surfaces 4, and removably attachable layers 6 as seen in FIG. 2, it will be appreciated that any of the previous embodiments may be used, so long as their attachment elements 8 allow the panels 2 to be placed side by side with no features separating them.

Figure 8:
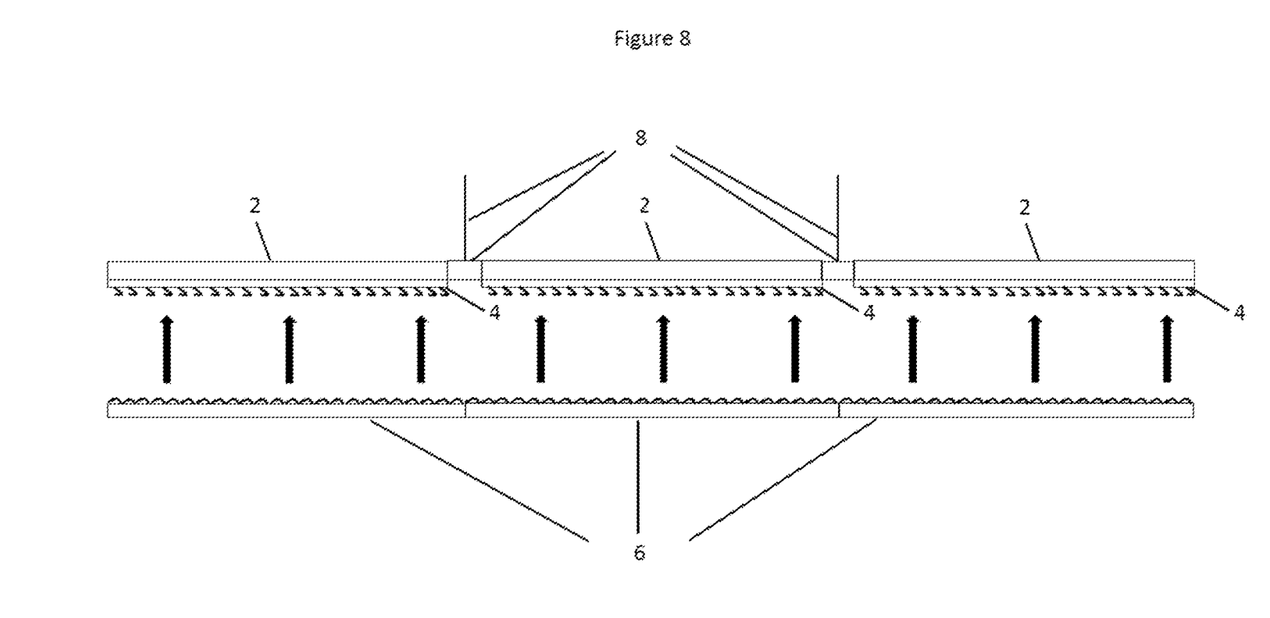
FIG. 8 outlines a panel coating system according to the present invention, including a plurality of panels with receiving surfaces, and respective removably attachable layers, with alternate attachment elements.

FIG. 8 shows a panel coating system according to the present invention, comprising a plurality of panels 2, with receiving surfaces 4, and respective removably attachable layers 6.

In FIG. 8, it is illustrated how the panel coating system of the present invention may be applied when the attaching means comprise features which separate the adjacent panels 2, for example a grid like structure.

As can be seen in FIG. 8, the removably attachable layers 6 may be sized such that they have a surface area larger than the panel 2 to which they are to be attached. They may thereby also cover the attachment elements 8 adjacent to said panel 2.

In this manner an optically closed surface may be formed, covering the attachment elements 8.

Whilst FIG. 8 has been shown using multiple panels 2, receiving surfaces 4, and removably attachable layers 6 as seen in FIG. 1, it will be appreciated that any of the previous embodiments may be used, so long as their attachment elements 8 separate adjacent panels 2.

The formation of holes 14 in the panel 2 and perforations in the receiving surface 4 may be performed in a number of different ways according to the present invention.

Firstly, when the perforations in the receiving surface 4 are intended to comprise holes 16 that match, and align with, the holes 14 of the panel 2, the formation of the holes in both the receiving surface 4 and the panel 2 may be formed in a single step. The panel 2 and receiving surface 4 (prior to the holes being made in either) may be fixed together, and then a hole creation process, by any suitable means, made be performed on the two features together.

Secondly, the perforations in the receiving surface 4, and the holes 14 of the panel 2, may both be produced in separate processes, wherein the receiving surface 4 and the panel 2 are attached to one another afterwards.

Thirdly, the holes 14 may be produced in the panel 2, after which, the receiving surface 4 may be attached. Perforations may then be produced in the receiving surface 4 after the two layers are attached.

Finally, the receiving surface 4 may be produced with a net like structure wherein there are large perforations/openings. Holes 14 may also be formed in the panel 2, and the two layers may be joined subsequently.

It should be noted that perforations may include large visible holes 16, or alternatively may comprise micro perforations that are not visible to the human eye, at least not from about 1 meter or more distance. The perforations should, however, allow the layer to be air permeable.

The removably attachable layer 6 of the present invention may be made of one or more of the following: a fibrous material, synthetic fibre, natural fibre, e.g. any kind of wool, a mineral fibre, acoustic foam, acoustic fiberglass, polyester, etc. The panel 2 may be a gypsum plasterboard, a mineral fibreboard, a mineral fibre plasterboard or any other known panel, preferably acoustic panel. The panel 2 may be perforated or not perforated.

The use of a plurality of removably attachable layers 6 allows various designs and colours of a surface to be changed easily. This may allow the invention to be utilised in the field of signs and billboard advertising. Furthermore, the removably attachable layer 6 may be covered in a chosen colour prior to installation, thereby aiding a user by allowing colour to be applied whilst it is not connected to a surface. A plurality of the removably attachable layers 6 according to the present invention may be coloured a single colour for a particular use. For example, a number of white removably attachable layers 6 may form a projector screen when installed, whilst a number of green removably attachable layers 6 may allow for the creation of an easy green screen environment.

The panels 2 may also be attached to a freestanding structure such as a room dividing panel, sign or billboard. In the field of advertising, customisable panels that can be easily attached and detached would allow for easier and quicker, non-permanent, attachment of a temporary sign. The panels 2 themselves may alternatively form a freestanding structure such that they do not need to be attached to an external surface.

The "complementary hooks, and layer onto which hooks can grip" method of fastening, offers a clean method by which to coat a surface. The lack of plaster or wallpaper ensures that particulates cannot mix with, and deteriorate the coating application. Furthermore, the materials used in the system are not harmful to the health of an operator, and may be completely organic e.g. felt. This also means recyclable materials may be used, thus reducing any negative environmental impacts. Furthermore, transport and storage of the materials is very simple, and the materials used may be somewhat damage resistant.

However, it is also possible that the "complementary hooks and layer onto which hooks can grip, which may comprise loops", are a combination of loops and mushroom-like formations, or even of mushroom-like formations on both sides.

Further advantages offered by the system of the present invention include easy cleaning and repairs, wherein the removably attachable layers 6 may be removed and cleaned in an environment where the removably attachable layer 6 can be easily accessed and worked upon. Should removably attachable layers 6 be damaged to an extent wherein mere repairs are insufficient, they can be easily removed and replaced. Through standard sizing, and the removably attachable layers 6 being easily modifiable, a replacement may be easily fit into the position of the old removably attachable layer 6. This thereby prevents the need for renovating an entire surface such as a ceiling, wall or floor, in the case that a small section has been heavily damaged.

The simple structure and readily available materials also ensures that the system remains cheap to purchase.

The versatility of the system also means removably attachable layers 6 can be available in a large variety of colours, prints, and materials, depending on the consumer's needs. As such, room redecoration can be performed easily, and without impeding the sound dampening properties of the system.

REFERENCE NUMERALS

2—Panel
4—Receiving surface
6—Removably attachable layer
8—Attachment element
10—Hooks
12—Gripable surface elements
14—Panel holes
16—Receiving surface holes

The invention claimed is:

1. A panel coating system comprising:
a panel having a plurality of holes configured for providing sound dampening effects;
a receiving surface secured to said panel, said receiving surface comprising one of:
a plurality of hooks; and
a plurality of gripable surface elements which are configured to be releasably secured to said plurality of hooks; and
an air permeable removably attachable layer which comprises the other of said plurality of hooks and said plurality of gripable surface elements, said removably attachable layer being releasably secured to said receiving surface and said removably attachable layer comprising a plurality of openings distinguishable from said plurality of holes in said panel wherein said receiving surface excludes said one of said plurality of hooks and said plurality of gripable surface elements in a space of said receiving surface corresponding to said plurality of holes of said panel.

2. The panel coating system of claim 1, wherein the receiving surface is air permeable.

3. The panel coating system of claim 1, wherein the panel is connectable to an external surface via one or more attachment elements.

4. The panel coating system of claim 3, wherein the attachment elements suspend the panel from the surface.

5. The panel coating system of claim 1, wherein the gripable surface elements comprise either loops or fibers that can be gripped by the hooks.

6. The panel coating system of claim 1, wherein the gripable surface elements are made of felt.

7. The panel coating system of claim 1, wherein the panel has a sound absorbing structure.

8. The panel coating system of claim 6, wherein the receiving surface comprises a plurality of holes, wherein the plurality of holes of the receiving surface align with the plurality of holes of the panel.

9. The panel coating system claim 1, further comprising an additional outer layer fixed to the removably attachable layer, on the opposite side to the side for attaching to the receiving surface.

10. The panel coating system of claim 3, wherein the attachment elements comprise railings running along one or more edges of the panel.

11. The panel coating system of claim 10, wherein the removably attachable layer has a surface area that covers both the panel and the railings.

12. The panel coating system of claim 1, further comprising one or more additional panels, each with a respective receiving surface.

13. The panel coating system of claim 12, further comprising two or more removably attachable layers, such that each of the panels has one of the removably attachable layers.

14. The panel coating system of claim 12, wherein a plurality of panels share a single removably attachable layer.

15. The panel coating system of claim 13, wherein the removably attachable layers have side surfaces that when placed next to one another, show no gaps between the removably attachable layers.

16. The panel coating system of claim 13, wherein the removably attachable layers are made of a synthetic and/or natural fiber.

17. The panel coating system of claim 16, wherein the removably attachable layers are made of felt.

18. The panel coating system of claim 16, wherein each of the removably attachable layers are joined to an adjacent one of the removably attachable layers by felting.

19. The panel coating system of claim 1, wherein the surface of the removably attachable layer on the opposite side to the surface for attaching to the receiving surface is optically closed.

20. A method for producing a panel coating system, including:
fixing a receiving surface to a panel having a plurality of holes configured for providing sound dampening effects, wherein said receiving surface comprises one of:
a plurality of hooks; and
a plurality of gripable surface elements which are configured to be releasably secured to said plurality of hooks; and
releasably securing an air permeable removably attachable layer to said panel, wherein said removably attachable layer comprises the other of said plurality of hooks and said plurality of gripable surface elements and further comprises a plurality of openings distinguishable from said plurality of holes in said panel wherein said receiving surface excludes said one of said plurality of hooks and said plurality of gripable surface elements in a space of said receiving surface corresponding to said plurality of holes of said panel.

21. The method for producing a panel coating system of claim 20, further including:
wherein the receiving surface is air permeable.

22. The method for producing a panel coating system of claim 20, further including:
perforating the receiving surface.

23. The method for producing a panel coating system of claim 22, wherein the receiving surface is fixed to the panel, and a plurality of holes in the receiving surface and the plurality of holes in the panel are then produced in a single process.

24. The method for producing a panel coating system of claim 22, wherein the perforation of the receiving surface is performed after the plurality of holes in the panel are produced, and the receiving surface is fixed to the panel after the perforation of the receiving surface is performed.

25. The method for producing a panel coating system of claim 22, wherein the receiving surface is attached to the panel after the plurality of holes are produced in the panel, and subsequently the receiving surface is perforated.

26. The method for producing a panel coating system of claim 20, further including:
   producing the receiving surface with a net structure, including a plurality of openings.

\* \* \* \* \*